(12) United States Patent
Iino et al.

(10) Patent No.: US 6,192,006 B1
(45) Date of Patent: Feb. 20, 2001

(54) DEVICE FOR AND A METHOD OF DETERMINING THE ANGLE OF INCIDENCE OF A RECEIVED SIGNAL AND A SCANNING SONAR

(75) Inventors: Hiroshi Iino; Itsuo Fukuoka, both of Kobe; Tatsuo Hayashi, Takarazuka; Yasuo Ito, Nishinomiya, all of (JP)

(73) Assignee: Furuno Electric Company Limited, Nishinoniya (JP)

( * ) Notice: Under 35 U.S.C. 154(b), the term of this patent shall be extended for 0 days.

(21) Appl. No.: 09/239,146

(22) Filed: Jan. 28, 1999

(30) Foreign Application Priority Data

Jan. 30, 1998 (JP) .................................................. 10-018628

(51) Int. Cl.$^7$ ....................................................... G01S 3/80
(52) U.S. Cl. ........................... 367/121; 367/124; 367/119
(58) Field of Search ..................... 367/119, 121, 367/123, 124

(56) References Cited

U.S. PATENT DOCUMENTS

| | | | |
|---|---|---|---|
| 3,859,622 | * | 1/1975 | Hutchinson et al. ................ 367/122 |
| 4,190,818 | * | 2/1980 | Follin et al. .......................... 367/138 |
| 4,414,654 | * | 11/1983 | Hill et al. ............................. 367/103 |
| 4,425,634 | | 1/1984 | Iino et al. . |

FOREIGN PATENT DOCUMENTS 1 509 333   5/1978 (GB) .

* cited by examiner

*Primary Examiner*—Ian J. Lobo

(57) ABSTRACT

A transducer is constructed of a plurality of transducer elements which are arranged in multiple layers and columns forming as a whole a generally cylindrical shape. A scanning sonar employing the transducer thus constructed can be switched between horizontal scan mode in which a vertically focused beam having a narrow horizontal beam angle (high horizontal directivity) is steered around the transducer using all the transducer elements and vertical scan mode in which a horizontally focused beam having a narrow vertical beam angle (high vertical directivity) is steered in a vertical plane directed in a specified scan azimuth to find out the angle of incidence of a received signal. The horizontally focused beam is formed by using the transducer elements of specific columns centered on the specified scan azimuth. A vertical scan signal obtained in the vertical scan mode is multiplied by a chirp signal. A correlator provided in a succeeding stage converts the amount of Doppler shift into time data and determines the angle of incidence of the received signal.

17 Claims, 9 Drawing Sheets

ANGLE OF INCIDENCE a = 0° (HORIZONTALLY DIRECTED BEAM)

ANGLE OF INCIDENCE a = 30° (DOWNWARD LOOKING BEAM)

DEVICE FOR AND A METHOD OF DETERMINING THE ANGLE OF INCIDENCE OF A RECEIVED SIGNAL AND A SCANNING SONAR

BACKGROUND OF THE INVENTION AND RELATED ART STATEMENT

The present invention relates to a device for and a method of determining the angle of incidence of a received signal by performing a vertical scanning operation using a generally cylindrical transducer, as well as to a scanning sonar employing such device and/or method.

Scanning sonars are widely used for detecting underwater objects. A scanning sonar employs a transducer having a generally cylindrical shape as shown in FIG. 3 to detect underwater objects in all surrounding areas. Ultrasonic waves are radiated in all directions around the transducer and a vertically focused receiving beam, which is focused within a specified angle in a vertical plane to produce specific vertical directivity, is formed by summing signals reflected by the underwater objects and received by every vertical array, or column, of transducer elements with appropriate time delays inserted into the individual reflected signals. The receiving beam thus formed is rotated, as if a single column of transducer elements is mechanically rotated around the cylindrical shape, by switching the transducer elements from one vertical array to another around the transducer to scan the objects in all azimuthal directions. It is possible to control the downward-looking angle, or the tilt angle, of the receiving beam by varying the time delays applied to the individual transducer elements, whereby the scanning sonar can search out objects within a specific vertical sector area in all directions around the transducer.

In the conventional scanning sonar of the aforementioned construction, the receiving beam directed to a specific tilt angle is horizontally rotated around the transducer in each horizontal scanning cycle. Thus, if it is desired to detect vertically distributed objects, it is necessary to carry out successive horizontal scanning cycles while sequentially varying the tilt angle of the receiving beam in one scanning cycle after another.

Although the prior art discloses a transducer constructed in a spherical shape which can steer a receiving beam not only horizontally but also vertically, the spherically shaped transducer has such problems that it necessitates complex combinations of transducer elements for beam forming and its target detecting ability in horizontal scan mode, which is the most often used mode of operation, is inferior to that of the cylindrical transducer.

SUMMARY OF THE INVENTION

In view of the aforementioned problems of the prior art, it is an object of the invention to provide a device for and a method of determining the angles of incidence of a received signal that make it possible to vertically scan underwater objects using a transducer constructed of a plurality of transducer elements arranged in a cylindrical shape as well as a scanning sonar employing such device and/or method.

According to the invention, a device for determining the angle of incidence of an incident ultrasonic signal comprises an ultrasonic transducer constructed of a plurality of transducer elements which are arranged in multiple layers and columns forming as a whole a generally cylindrical shape, a horizontally focused beam former which sums signals received by the individual transducer elements of specific columns centered on a specified scan azimuth for each layer to generate horizontally focused beam signals which provide high horizontal directivity, a vertical scan signal former which forms a vertical scan signal by sequentially selecting and combining the horizontally focused beam signals from the uppermost layer to the lowermost layer, or from the lowermost layer to the uppermost layer, and an angle detector which detects the angle of incidence of the incident ultrasonic signal based on the amount of frequency shift of the vertical scan signal.

According to the invention, a method of determining the angle of incidence of an incident ultrasonic signal by using an ultrasonic transducer constructed of a plurality of transducer elements which are arranged in multiple layers and columns forming as a whole a generally cylindrical shape, the method comprising the steps of summing signals received by the individual transducer elements of specific columns centered on a specified scan azimuth for each layer to generate horizontally focused beam signals which provide high horizontal directivity, generating a vertical scan signal by sequentially selecting and combining the horizontally focused beam signals from the uppermost layer to the lowermost layer, or from the lowermost layer to the uppermost layer, and detecting the angle of incidence of the incident ultrasonic signal based on the amount of frequency shift of the vertical scan signal.

A scanning sonar of the invention comprises an ultrasonic transducer constructed of a plurality of transducer elements which are arranged in multiple layers and columns forming as a whole a generally cylindrical shape, a horizontally focused beam former which sums signals received by the individual transducer elements of specific columns centered on a specified scan azimuth for each layer to generate horizontally focused beam signals which provide high horizontal directivity, a vertical scan signal former which forms a vertical scan signal by sequentially selecting and combining the horizontally focused beam signals from the uppermost layer to the lowermost layer, or from the lowermost layer to the uppermost layer, and an angle detector which detects the angle of incidence of an incident ultrasonic signal based on the amount of frequency shift of the vertical scan signal, a vertically focused beam former which sums signals received by the individual transducer elements of each column to generate vertically focused beam signals which provide high vertical directivity, a horizontal scan signal former which forms a horizontal scan signal by sequentially selecting and combining the vertically focused beam signals derived from the individual columns around the transducer, and a signal generator which takes out a signal from a specified direction based on the amount of frequency shift of the horizontal scan signal, wherein the vertically focused beam former, the horizontal scan signal former and the signal generator are activated in horizontal scan mode, and the horizontally focused beam former, the vertical scan signal former and the angle detector are activated in vertical scan mode.

In one form of the invention, the angle detector and the signal generator of the aforementioned scanning sonar share a common correlator.

A principle applied to this invention is now briefly described with reference to FIGS. 1A and 1B. If a receiving transducer R is moving in a straight line with velocity v and a signal of frequency fs is incident on the receiving transducer R at the angle of incidence α as shown in FIG. 1A, the apparent frequency f of the signal as it is received by the receiving transducer R differs from the actual frequency fs of the incident signal due to the Doppler effect. This can be expressed by $$f=(1+(v/c)\sin\alpha)fs$$

where c is the sound velocity. If the frequency fs of the incident signal is known, it is possible to calculate the angle of incidence $\alpha$ by substituting the Doppler-shifted frequency f into the above equation.

While the receiving transducer R is physically moved in the example shown in FIG. 1A, a similar effect can be produced by using a phased array technique in which the incident signal is received by a transducer array whose individual elements are sequentially switched. FIG. 1B depicts an example of such phased array approach, in which a plurality of receiving transducer elements are arranged in a straight line at regular intervals d. Sequentially switching the transducer elements at a switching frequency s yields the same result as would be obtained by physically moving a single transducer element at a velocity v=d·s.

Based on the above principle, this invention provides means for vertical scanning (steering of an ultrasonic sounding beam in a specific vertical plane) using an ultrasonic transducer constructed of a plurality of transducer elements which are arranged in multiple layers and columns forming as a whole a generally cylindrical shape. More specifically, a specific number of transducer elements centered on a specified scan azimuth that are arranged in a circular arc in each layer are used for vertical scan operation. Signals received by these transducer elements in each layer are combined to produce a horizontally focused receiving beam having a narrow horizontal beam angle (high horizontal directivity) and a wide vertical beam angle. By forming the horizontally focused beam in this fashion, signals incident from outside a narrow sector area centered on the specified scan azimuth are rejected. Horizontally focused beam signals derived from the individual layers in the above-stated manner are sequentially selected from the uppermost layer to the lowermost layer, or from the lowermost layer to the uppermost layer, and combined together to produce a vertical scan signal. All the horizontally focused beam signals are derived from the same incident signal as is the case with the examples of FIGS. 1A and 1B. Thus, successive switching of the horizontally focused beam from the uppermost layer to the lowermost layer, or from the lowermost layer to the uppermost layer, produces the same effect that would be obtained by physically moving a single layer of transducer elements downward or upward in steps of the height of each layer. Accordingly, the horizontally focused beam signals derived from the individual layers are Doppler-shifted, in which the amount of Doppler shift (frequency shift) is a function of the angle of incidence $\alpha$. It is therefore possible to calculate the angle of incidence $\alpha$ of the incident signal by detecting the amount of Doppler shift. The aforementioned generally cylindrical shape of the transducer includes not only an exactly cylindrical shape but also a truncated cone shape of which top and bottom surfaces have different diameters.

A scanning sonar employing a transducer having a generally cylindrical shape usually forms a static vertically focused receiving beam which has a narrow vertical beam angle (high vertical directivity) and is fixed to a specified tilt angle. In prior art technology, the vertically focused receiving beam is steered around the transducer and an incident signal is converted into a chirp signal and, then, the angle of incidence of the incident signal is determined by finding out an azimuth at which the chirp signal is detected (Japanese Examined Patent Publication No. 63-7350). The scanning sonar as claimed in claim 3 can be switched between the horizontal scan mode and vertical scan mode. Given this capability, the scanning sonar of the invention can detect not only horizontally distributed objects using the ordinary horizontal scan mode but also vertically distributed objects using the vertical scan mode. This dual-mode capability can be realized by using a correlator formed of a matched filter, for example, which is used for detecting the chirp signal in the horizontal scan mode to detect the amount of frequency shift in the vertical scan mode as well.

As briefly described above, this invention makes it possible to vertically steer a horizontally focused beam within a specific vertical plane using a transducer array configured in a generally cylindrical shape. This means that the vertical scan operation can be accomplished by using a scanning sonar having basically the same construction as the conventional scanning sonars. The scanning sonar of this invention may usually be operated in the conventional horizontal scan mode and switched to the vertical scan mode whenever it becomes necessary to do so. As most of constituent components are commonly used in both the horizontal and vertical scan modes, it is possible to simplify the construction of the scanning sonar and reduce its physical size and production costs.

These and other objects, features and advantages of the invention will become more apparent upon reading the following detailed description in conjunction with the accompanying drawings.

DETAILED DESCRIPTION OF THE PREFERRED EMBODIMENT OF THE INVENTION

Figure 2:
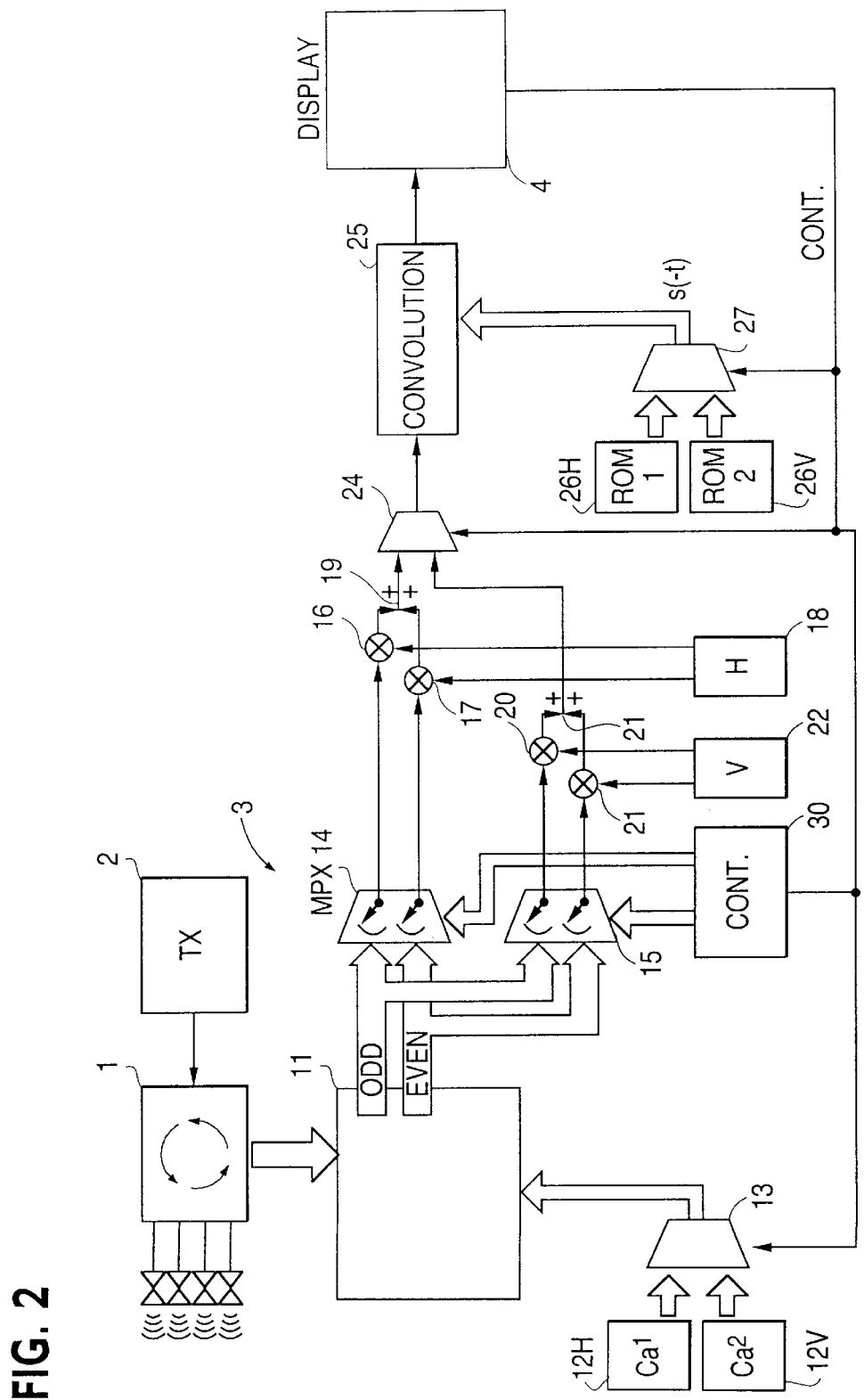
FIG. 2 is a block diagram generally showing the construction of a scanning sonar according to a preferred embodiment of the invention.
Figure 3:
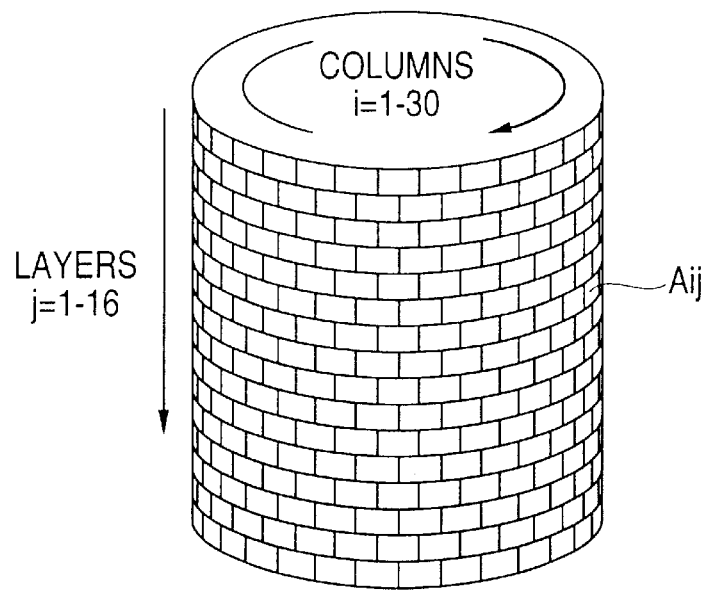
FIG. 3 is a perspective view showing how a transducer of the scanning sonar of FIG. 2 is constructed.

A scanning sonar according to a preferred embodiment of the invention is now described with reference to the accompanying drawings. FIG. 2 is a block diagram of the scanning sonar of the invention and FIG. 3 is a perspective view of a cylinder-shaped transducer 1 used in the scanning sonar. As shown in FIG. 3, the transducer 1 is constructed of 480 transducer elements Aij (i=1 to 30, j=1 to 16) stacked in 16 layers of annular arrays, each layer including 30 transducer elements. The transducer elements of odd-numbered layers ODD are displaced from those of even-numbered layers EVN in a circumferential direction as much as the width of each transducer element so that the transducer elements are arranged as a whole in an ordinary brickwork structure with alternate joint arrangement. The transducer 1 thus constructed is installed in a ship's hull in such a way that the axis of the cylindrical shape of the transducer 1 is vertically positioned. The transducer 1 is connected to a transmitter block 2 and a receiver block 3. The transmitter block 2 supplies electric signals, which are phased in a particular fashion, to the individual transducer elements to emit an ultrasonic beam into the water.

The transducer elements of the transducer 1 are individually connected to a beam former 11 provided in the receiver block 3. The beam former 11 forms a receiving beam by shifting the phase of received signals entered from the individual transducer elements in a particular fashion and then summing these signals. During horizontal scan mode, in which areas all around the transducer 1 are scanned at a specific tilt angle, a vertically focused beam whose response is sharply focused to produce a narrow vertical beam angle is formed by summing signals entered from all transducer elements in one vertical array after another. During vertical scan mode, in which a vertical cross section of the underwater situation in a particular azimuth is vertically scanned, signals received by and entered from six adjacent transducer elements centered on the specified scan azimuth, including three transducer elements each on the left and right sides of the scan azimuth, in each element layer are summed to produce a horizontally focused beam whose response is sharply focused to produce a narrow horizontal beam angle.

To create the aforementioned horizontally focused and vertically focused beams, it is necessary to sum the signals entered from the individual transducer elements with a particular phase relationship among them. The beam former 11 amplifies the received signals and shifts them in phase by multiplying them by specific carrier signals to achieve a desired phase relationship. The carrier signals are produced by a horizontal scan mode carrier signal generator 12H and a vertical scan mode carrier signal generator 12V and supplied to the beam former 11 through a selector 13. Controlled by a controller 30, the selector 13 supplies the carrier signals produced by the horizontal scan mode carrier signal generator 12H to the beam former 11 in the horizontal scan mode, while it supplies the carrier signals produced by the vertical scan mode carrier signal generator 12V to the beam former 11 in the vertical scan mode.

The scanning sonar of this embodiment can scan areas all around the transducer 1 at a tilt angle set between 0° and 45° below the water surface, for example, in the horizontal scan mode. In the vertical scan mode, it can scan through a vertical scan coverage of 0° to 45° below the water surface, for example, in a desired azimuth.

Figure 4A:
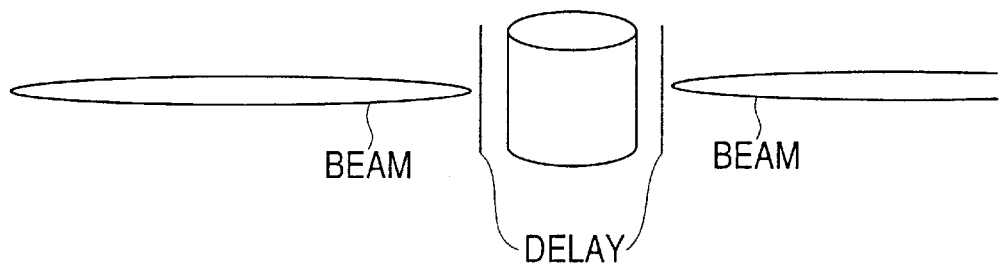
FIGS. 4A and 4B are diagrams illustrating vertically focused beams formed by the scanning sonar in horizontal scan mode.
Figure 4B:
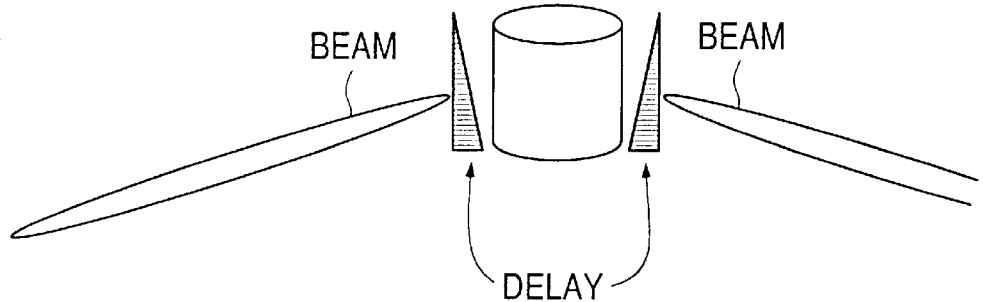

FIGS. 4A and 4B are diagrams illustrating vertically focused beams formed by the beam former 11 in the horizontal scan mode. Shown in FIG. 4A is a receiving beam produced when the tilt angle is set to 0° to scan a full-circle area in a horizontal plane. When the signals received by the transducer elements of all the layers are summed for each vertical array, or column, in the equally phased form, that is, without inserting any phase delays, the beam former 11 produces a vertically focused beam having a narrow vertical beam angle (high vertical directivity) and a wide horizontal beam angle. In producing the vertically focused beam, the beam former 11 separately sums the signals fed from the transducer elements of the odd-numbered layers ODD (j=1, 3, 5, 7, 9, 11, 13, 15) and the signals fed from the transducer elements of the even-numbered layers EVN (j=2, 4, 6, 8, 10, 12, 14, 16) and supplies vertically focused beam signals derived from the odd-numbered layers ODD and vertically focused beam signals derived from the odd-numbered layers EVN to a multiplexer 14 for horizontal scan operation.

On the other hand, FIG. 4B shows a downward-looking receiving beam produced when scanning a full-circle area around the transducer 1 at a tilt angle greater than 0°. To produce the receiving beam having such downward-looking directivity by summing the signals received by the transducer elements of each column of the transducer 1, phase delays which are made progressively greater from the uppermost layer to the lowermost layer are inserted into the signals received by the transducer elements of the individual layers. To create the aforementioned phase relationship among the signals fed from the transducer elements of the odd-numbered layers ODD (j=1, 3, 5, 7, 9, 11, 13, 15) and the even-numbered layers EVN (j=2, 4, 6, 8, 10, 12, 14, 16), the horizontal scan mode carrier signal generator 12H generates seven carrier signals for delaying the phases of the signals fed from the transducer elements of the odd-numbered layers ODD and the transducer elements of the even-numbered layers EVN except those of the first and second layers (j=1, 2) from the top of the transducer 1. It is to be noted here that the phases of the signals fed from the transducer elements of the first and second layers (j=1, 2) are not delayed. The amounts of phase delays for the third to the sixteenth layers are determined with reference to the phase of the signals picked up by the transducer elements of the first or second layer. The beam former 11 first multiplies the signals fed from the transducer elements of the odd-numbered and even-numbered layers (j=3 to 15, 4 to 16) excluding the first and second layers by the respective carrier signals. Then, the beam former 11 separately sums the signals fed from the transducer elements of the odd-numbered layers ODD (j=1, 3, 5, 7, 9, 11, 13, 15) and the signals fed from the transducer elements of the even-numbered layers EVN (j=2, 4, 6, 8, 10, 12, 14, 16) to form 60 vertically focused beam signals. The tilt angle of the vertically focused beam can be varied between 0° and 45° by properly adjusting the amounts of phase delays for the individual layers. It is possible, if necessary, to form an upward-looking receiving beam by inserting progressively greater phase delays into the signals received by the transducer elements of upper layers.

In the horizontal scan mode, the transmitter block 2 supplies electric signals shifted in phase to produce the same phase relationship as established among the individual layers of the transducer elements in producing the aforementioned receiving beam to all the transducer elements simultaneously and thereby forms a full-circle disklike or umbrellalike transmission beam set to the same tilt angle as the receiving beam.

Figure 5A:
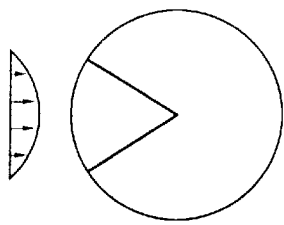
FIGS. 5A to 5F are diagrams illustrating horizontally focused beams formed by the scanning sonar in vertical scan mode.
Figure 5B:
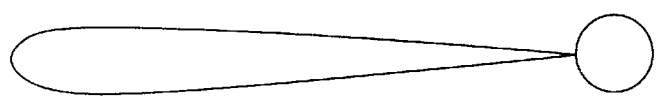

In the vertical scan mode, the transducer elements of only specific columns centered on a specified azimuth are used. FIGS. 5A to 5F are diagrams illustrating horizontally focused receiving and transmission beams formed in the vertical scan mode. More specifically, six adjacent transducer elements centered on the specified scan azimuth, including three transducer elements (i=k−3 to k+2) each on the left and right sides of the scan azimuth, in each element layer are used. Signals fed from the six transducer elements in each layer are summed, inserting greater phase delays into the signals received by the transducer elements close to the scan azimuth, or the center of the six transducer elements, as shown in FIG. 5A, to produce a horizontally focused beam having a narrow horizontal beam angle (high horizontal directivity) and a wide vertical beam angle as shown in FIG. 5B. Since such horizontally focused beam is formed for each layer, the beam former 11 outputs 16 horizontally focused beam signals (j=1 to 16) to a multiplexer 15 for vertical scan operation.

To create a phase relationship as depicted in FIG. 5A among the signals received by the six transducer elements in each layer, the vertical scan mode carrier signal generator 12V generates two types of carrier signals to be supplied to four central transducer elements. Since the amounts of phase shifting for the transducer elements on the left and right sides of the scan azimuth should be symmetrical, carrier signals with symmetrical phase delays are applied to the four central transducer elements (i=k−2 to k+1) without delaying the phases of the signals fed from the leftmost and rightmost transducer elements (i=k−3, k+2). The beam former 11 produces the horizontally focused beam signals by multiplying the signals fed from the central transducer elements (i=k−2 to k+1) by these carrier signals and then summing the signals derived from the transducer elements (i=k−3 to k+2). As it is made possible to point the horizontally focused beam in any azimuth by specifying a desired column k, the direction of the horizontally focused beam need not be varied, but is fixed in the vertical scan mode, unlike the tilt angle of the vertically focused beam that is sequentially varied in the horizontal scan mode.

Figure 5C:
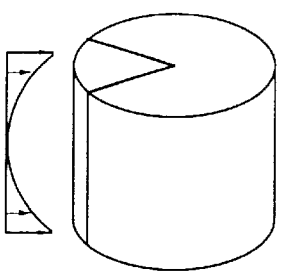
Figure 5D:
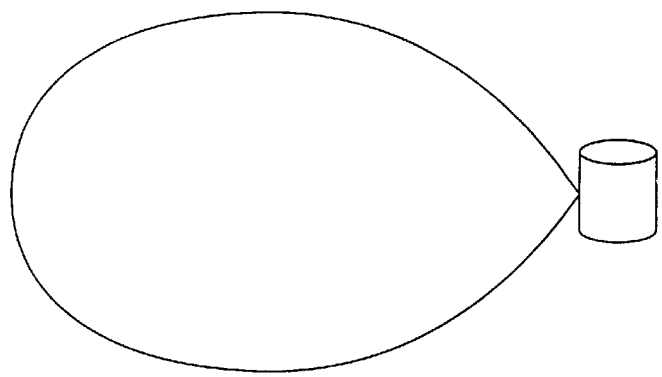
Figure 5E:
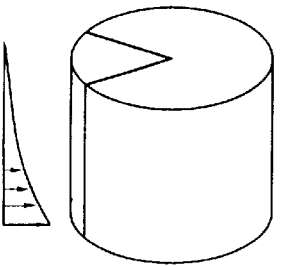
Figure 5F:
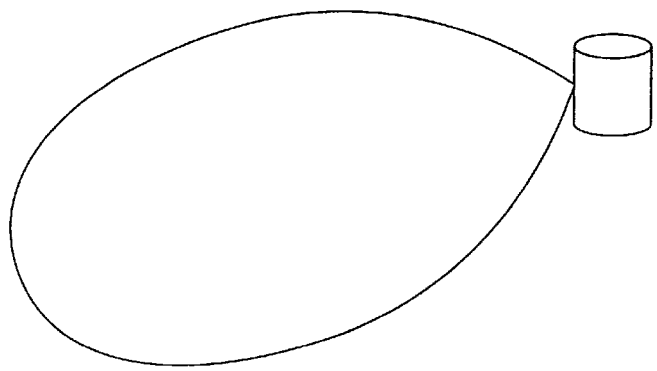

In the vertical scan mode, the transmitter block 2 forms a transmission beam having a vertically wide beam angle by simultaneously feeding signals of which phase relationship among the individual layers is controlled as depicted in FIG. 5C or 5E to the individual transducer elements. The transmission beam equally broadened upward and downward shown in FIG. 5D is formed when the signals depicted in FIG. 5C are supplied, whereas the downward-looking vertically wide transmission beam shown in FIG. 5F is created when the signals depicted in FIG. 5E are supplied.

Figure 6A:
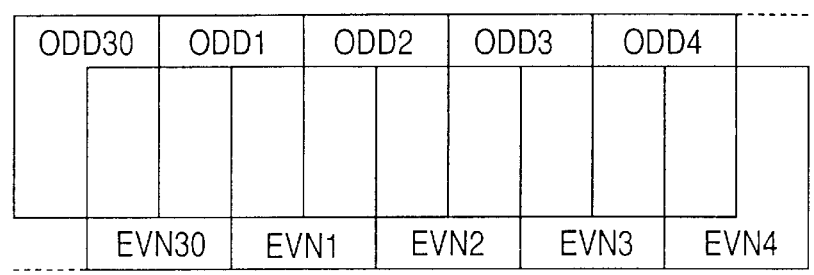
FIGS. 6A and 6B are diagrams showing the principles of interpolation and detection of the direction of an incident signal used in the horizontal scan mode.
Figure 6A:
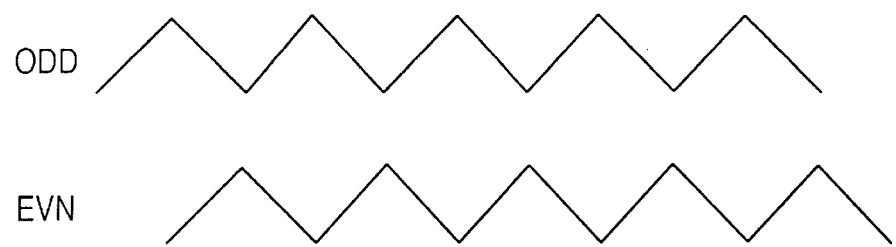
Figure 6B:
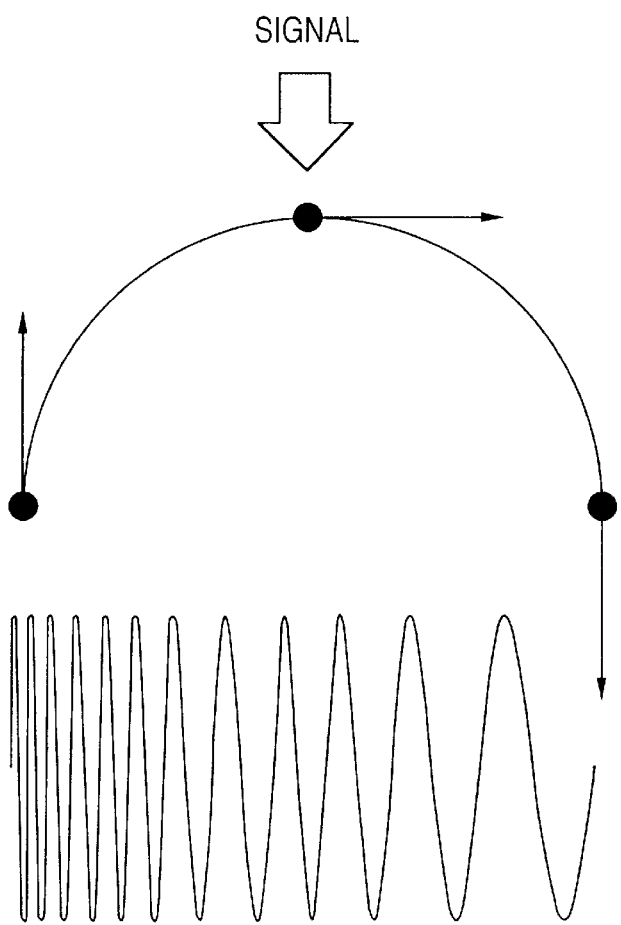

In the horizontal scan mode, the multiplexer 14 successively switches the vertically focused beam signals i fed from the transducer elements of the individual columns in the order of ODD1, EVN1, ODD2, EVN2, . . . ODD30, EVN30 at specified time intervals, where ODDi and EVNi represent odd-numbered and even-numbered columns, respectively. With this switching operation, the multiplexer 14 rotates, or steers, the vertically focused receiving beam around the transducer 1 and thereby produces a horizontal scan signal. To accomplish smooth steering of the receiving beam, the vertically focused beam signals derived from a currently selected odd-numbered layer ODD are entered into a multiplier 16, in which the vertically focused beam signals are multiplied by a triangular wave signal for the odd-numbered layer ODD shown in FIG. 6A, the vertically focused beam signals derived from a currently selected even-numbered layer EVN are entered into a multiplier 17, in which the vertically focused beam signals are multiplied by a triangular wave signal for the even-numbered layer EVN shown in FIG. 6A and, then, the vertically focused beam signals of both the odd-numbered and even-numbered layers are summed by an adder 19. The triangular wave signals are produced by an interpolation signal generator 18 and output to the individual multipliers 16, 17. As a result of the aforementioned operation, the adder 19 outputs the horizontal scan signal which is identical in receiving characteristics to a signal obtained by physically rotating a single transducer element. When a signal of a fixed frequency arriving from a distant sound source is received by such transducer element, the frequency of the received signal is Doppler-shifted as a result of rotation of the transducer element and a resultant horizontal scan signal contains a chirp signal component, in which the amount of frequency shift varies according to the relationship between the sound source and the angular position of the rotating transducer element as shown in FIG. 6B. A chirp signal is a signal whose frequency is gradually varied as shown in FIG. 6B. More specifically, the frequency of the chirp signal varies as follows. When the transducer element begins to receive the incoming signal, the frequency of the received signal is higher than that of the incoming acoustic signal due to a Doppler shift because the transducer element approaches the sound source in this stage. As the pointing direction of the beam gradually approaches the propagating direction of the incoming signal, the amount of frequency shift becomes smaller. The frequency of the received signal gradually decreases when the receiving beam is rotated further and the transducer element moves away from the sound source.

The waveform of the chirp signal is uniquely determined if the angular velocity of the rotating transducer element is constant and the transmitting frequency of the sound source is fixed. Thus, it is possible to detect the existence of a sound source (target) and determine its direction by ascertaining the waveform of the chirp signal.

Referring again to FIG. 2, a correlator 25 detects the existence of the above-mentioned chirp signal and compresses the beam. A pair of read-only memories (ROMs) 26 which serve as reference waveform storage devices are connected to the correlator 25 by way of a selector 27. These ROMs 26 include a ROM 26H for storing a chirp signal waveform for the horizontal scan mode and a ROM 26V for storing a chirp signal waveform for the vertical scan mode. Although the ROMs 26H and 26V are provided separately and switched by the selector 27 in the block diagram of FIG. 2, a single ROM may be used to store reference waveform data for both the horizontal and vertical scan modes provided that selective switching of the reference waveform data for the two modes is allowed through controlled access to relevant addresses.

The correlator 25 takes in 96 samples of the horizontal scan signal or of a vertical scan signal, which will be described later, through a selector 24 and outputs the result of correlation between the sampled input data and the reference waveform data. In the horizontal scan mode, the samples of the horizontal scan signal are sequentially entered into and shifted through a 96-stage shift register of the correlator 25 in synchronism with a clock which is identical to a vertically focused beam select clock supplied to the multiplexer 14. The 96-stage shift register also takes in 96 samples of the reference waveform data. The sampled input data and reference waveform data are compared in each stage of the 96-stage shift register and a value obtained by summing comparison results is output by the correlator 25 as its output data. When an ultrasonic wave reflected by a target is received, the resultant horizontal scan signal contains a chirp signal corresponding to the magnitude of the reflected ultrasonic wave at a point in scan time corresponding to the azimuth of the target. When the input waveform containing the chirp signal is entered into the correlator 25, it exhibits an extremely high correlation with the reference waveform which is also a chirp signal and, therefore, the correlator 25 provides a high output signal level. Information on the current scan azimuth is available from the controller 30 which outputs the select clock to the multiplexer 14. Thus, scan azimuth data obtained from the controller 30 and the output data of the correlator 25 are output to a display 4, whereby a video image of the detected target is displayed on the display 4 in the correct direction. The horizontal scan signal is formed successively while the vertically focused beam is rotated after each transmission of the transmission beam by the transmitter block 2 and ultrasonic waves reflected by nearby targets to distant targets are sequentially detected. Then, images of the detected targets are sequentially displayed on the display 4.

In the vertical scan mode, the horizontally focused beam signals produced by the beam former 11 are entered into the multiplexer 15. The multiplexer 15 has two processing channels, of which one channel (odd-numbered layer channel) sequentially selects the horizontally focused beam signals derived from the odd-numbered layers starting from their uppermost layer (j=1) and outputs a time-sequentially combined horizontally focused beam signal, while the other channel (even-numbered layer channel) sequentially selects the horizontally focused beam signals derived from the even-numbered layers starting from their uppermost layer (j=2) and outputs a time-sequentially combined horizontally focused beam signal. The combined horizontally focused beam signal derived from the odd-numbered layers is entered into a function multiplier 20 while the combined horizontally focused beam signal derived from the even-numbered layers is entered into a function multiplier 21.

Figure 7:
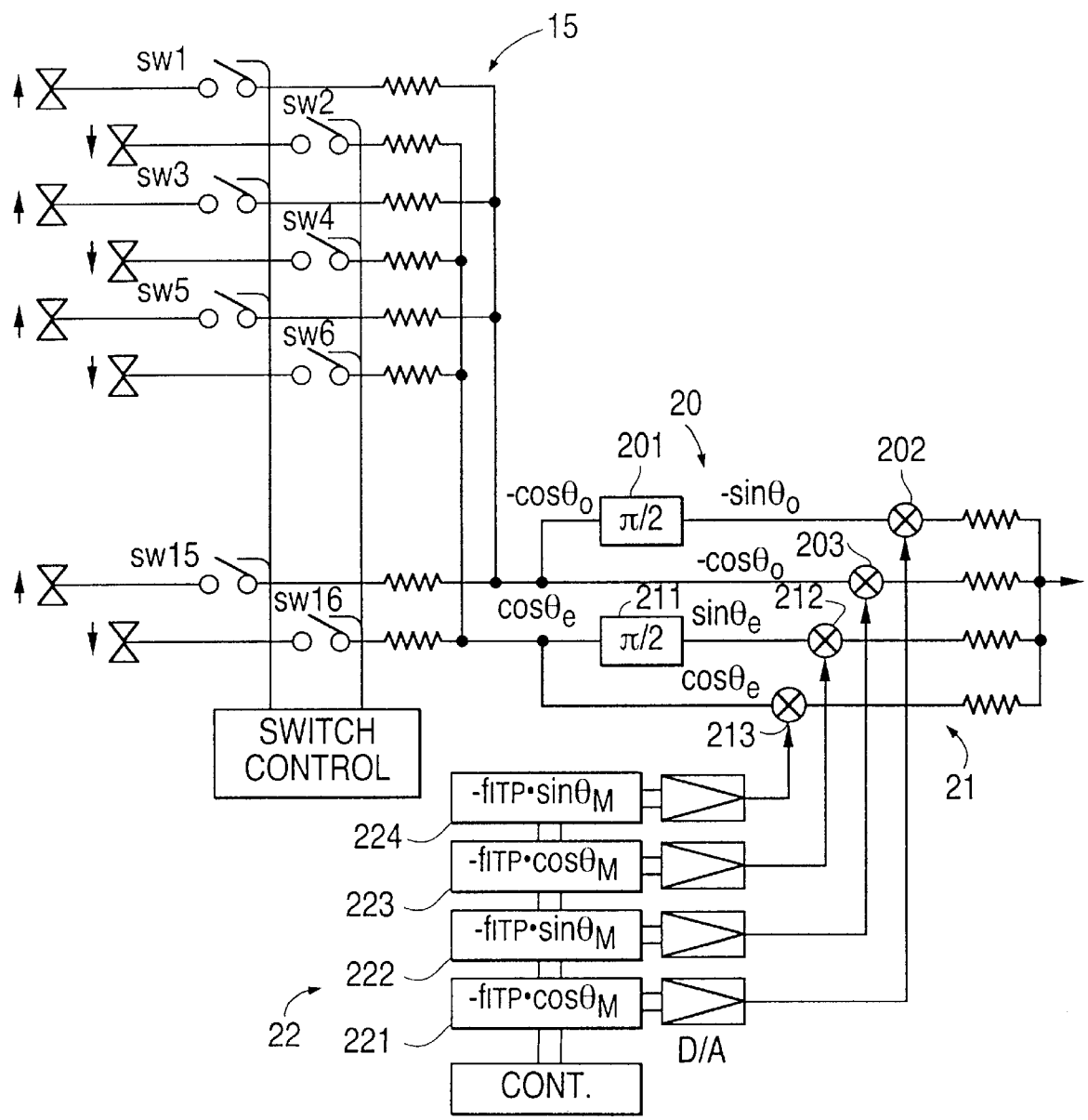
FIG. 7 is a detailed circuit diagram showing the configuration of a multiplexer, function multipliers and a function generator which together produce a vertical scan signal.
Figure 8A:
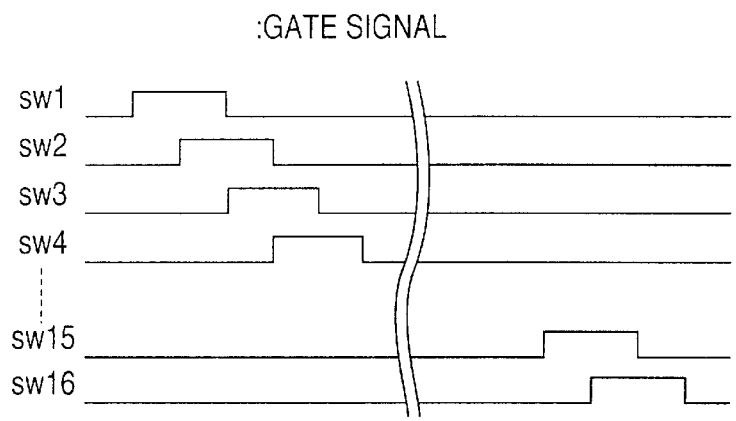
FIGS. 8A and 8B are a switching time chart of the multiplexer and a diagram showing function waveforms generated by the function multipliers, respectively.
Figure 8B:
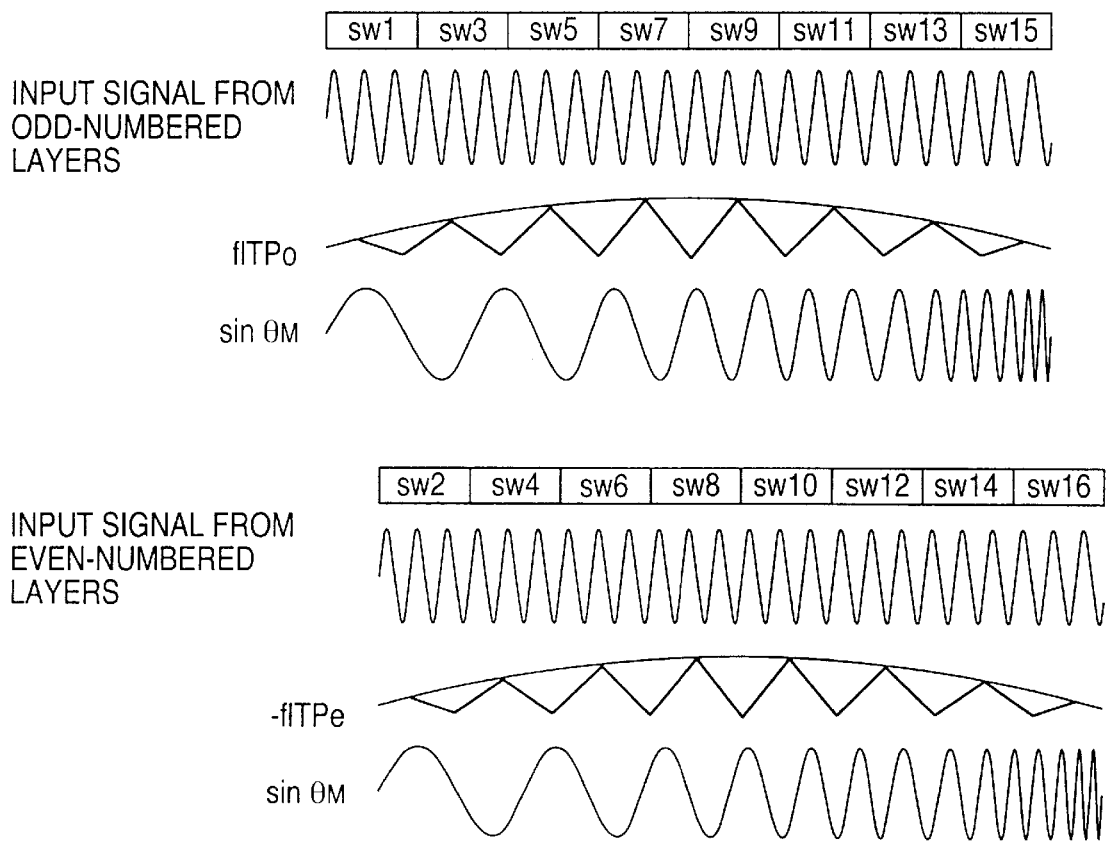

FIG. 7 is a detailed circuit diagram showing the configuration of the multiplexer 15, the function multipliers 20, 21 and a function generator 22. FIGS. 8A and 8B are a switching time chart of the multiplexer 15 and a diagram showing function waveforms generated by the function multipliers 20, 21, respectively.

The horizontally focused beam signals fed from the odd-numbered layers ODD (j=1, 3, 5, 7, 9, 11, 13, 15) are supplied to switches SW1, SW3, SW5, SW7, SW9, SW11, SW13 and SW15 of the multiplexer 15, respectively, while the horizontally focused beam signals fed from the even-numbered layers EVN (j=2, 4, 6, 8, 10, 12, 14, 16) are supplied to switches SW2, SW4, SW6, SW8, SW10, SW12, SW14 and SW16 of the multiplexer 15, respectively. Then, based on a select clock fed from the controller 30, the odd-numbered layer channel of the multiplexer 15 sequentially selects the horizontally focused beam signals entered from the odd-numbered layers and the even-numbered layer channel of the multiplexer 15 sequentially selects the horizontally focused beam signals entered from the even-numbered layers with switching timing shown in the time chart of FIG. 8A, in which the signals selected from the alternate odd-numbered and even-numbered layers overlap as much as one-half of the duration of each sampling gate pulse. Outputs of the odd-numbered and even-numbered layer channels of the multiplexer 15 are entered into the function multipliers 20, 21, respectively. In the vertical scan mode, each successive scanning cycle begins when the switch SW1 is turned on and ends when the switch SW16 is turned off. The vertical scan signal is produced by sampling the horizontally focused beam signals during each successive vertical scanning cycle using window functions. As previously mentioned, the receiving beam is continuously rotated around the transducer 1 to accomplish uninterrupted scanning in the horizontal scan mode. In the vertical scan mode, however, the continuity of the vertical scan signal is interrupted when the receiving beam, which is steered downward in each scanning cycle, is returned from the lower limit to the upper limit of the vertical scan coverage. The horizontally focused beam signals are multiplied by the aforementioned window functions every scanning cycle to prevent the occurrence of sidelobes.

The function multipliers 20, 21 multiply the input horizontally focused beam signals by the window functions, triangular wave signals for smooth interpolation and by a chirp signal which enables the correlator 25 to detect ultrasonic wave signals reflected by underwater targets. To prevent the occurrence of mirror images by multiplication, the function multipliers 20, 21 are connected in a doubled-balanced configuration. The function multiplier 20 branches the vertically focused beam signal ($-\cos \theta_o$) derived from the odd-numbered layers and entered from the multiplexer 15 into two signal paths. The vertically focused beam signal fed into one signal path is directly entered into a multiplier 203 while the vertically focused beam signal fed into the other signal path is delayed by a delay device 201 as much as $\pi/2$ and a resultant signal ($-\sin \theta_o$) is entered into a multiplier 202. The function generator 22 produces a signal $-f_{ITP} \sin \theta_M$ by multiplying a waveform signal $-f_{ITP}$, which is obtained by combining a window function waveform and a triangular wave signal, and supplies the signal $-f_{ITP} \sin \theta_M$ into the multiplier 203. The function generator 22 also supplies a signal $-f_{ITP} \cos \theta_M$, which is obtained by advancing the signal $-f_{ITP} \sin \theta_M$ as much as $\pi/2$, into the multiplier 202. Subsequently, outputs of the multipliers 202, 203 are added by an adder 23. Then, it is possible to obtain the following signal which only contains components expressed by a sum $\theta_o+\theta_M$, excluding components expressed by a difference $\theta_o-\theta_M$, as shown in FIG. 8B:

$$f_{ITP}(\cos \theta_M \cdot \sin \theta_o + \sin \theta_M \cdot \cos \theta_o) = f_{ITP} \cdot \sin(\theta_o + \theta_M) \qquad (1)$$

On the other hand, the function multiplier 21 also branches the vertically focused beam signal ($\cos \theta_e$) derived from the even-numbered layers and entered from the multiplexer 15 into two signal paths. The vertically focused beam signal fed into one signal path is directly entered into a multiplier 213 while the vertically focused beam signal fed into the other signal path is delayed by a delay device 211 as much as $\pi/2$ and a resultant signal ($\sin \theta_e$) is entered into a multiplier 212. The function generator 22 produces a signal $-f_{ITP}\sin \theta_M$ by multiplying a waveform signal $-f_{ITP}$, which is obtained by combining a window function waveform and a triangular wave signal, and supplies the signal $-f_{ITP}\sin \theta_M$ into the multiplier 213. The function generator 22 also supplies a signal $-f_{ITP}\cos \theta_M$, which is obtained by advancing the signal $-f_{ITP}\sin \theta_M$ as much as $\pi/2$, into the multiplier 212. Subsequently, outputs of the multipliers 212, 213 are added by the 23. Then, it is possible to obtain the following signal which only contains components expressed by a sum $\theta_e+\theta_M$, excluding components expressed by a difference $\theta_e-\theta_M$, as shown in FIG. 8B:

$$-f_{ITP}(-\cos \theta_M \cdot \sin \theta_e - \sin \theta_M \cdot \cos \theta_e) = f_{ITP} \cdot \sin(\theta_e + \theta_M) \qquad (2)$$

It is possible to obtain a smooth vertical scan signal by adding the aforementioned signals derived from the odd-numbered and even-numbered layers.

Figure 1A:
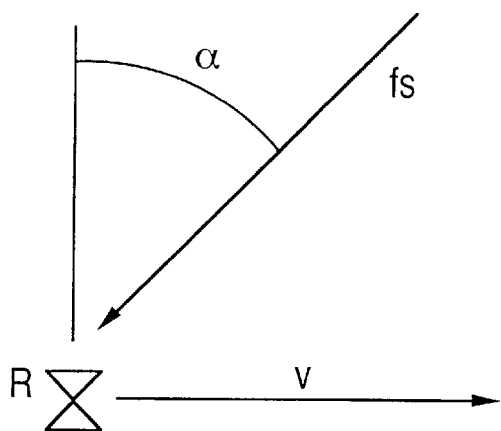
FIGS. 1A and 1B are diagrams showing the principle of a method of determining the angle of incidence of a received signal from the amount of Doppler shift according to the invention.
Figure 1B:
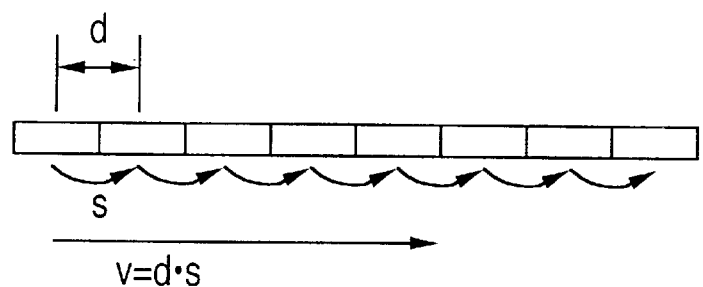

Referring now to FIGS. 1A and 1B, the frequency of ultrasonic waves reflected by an underwater target is Doppler-shifted, in which the amount of Doppler shift is related to the angle of incidence $\alpha$ of the reflected ultrasonic waves. It is therefore possible to determine the angle of incidence $\alpha$ by detecting the amount of Doppler shift. In this embodiment, the vertical scan signal is multiplied by a chirp signal so that the correlator 25 can convert the amount of Doppler shift (frequency value) into time data.

Figure 9A:
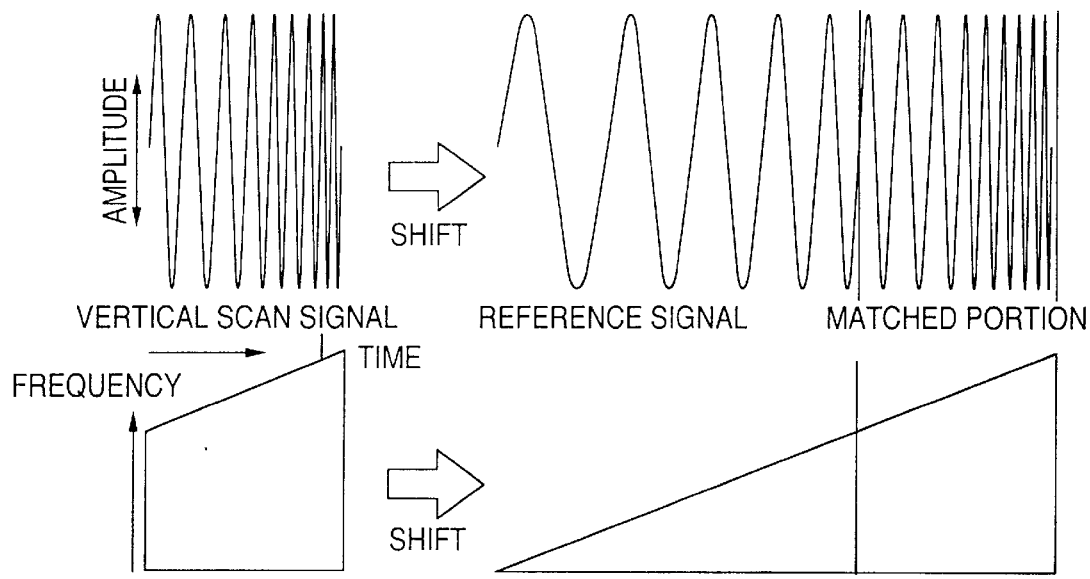
FIGS. 9A and 9B are diagrams showing the principle of a method of detecting the angle of incidence of a received signal in the vertical scan mode.
Figure 9B:
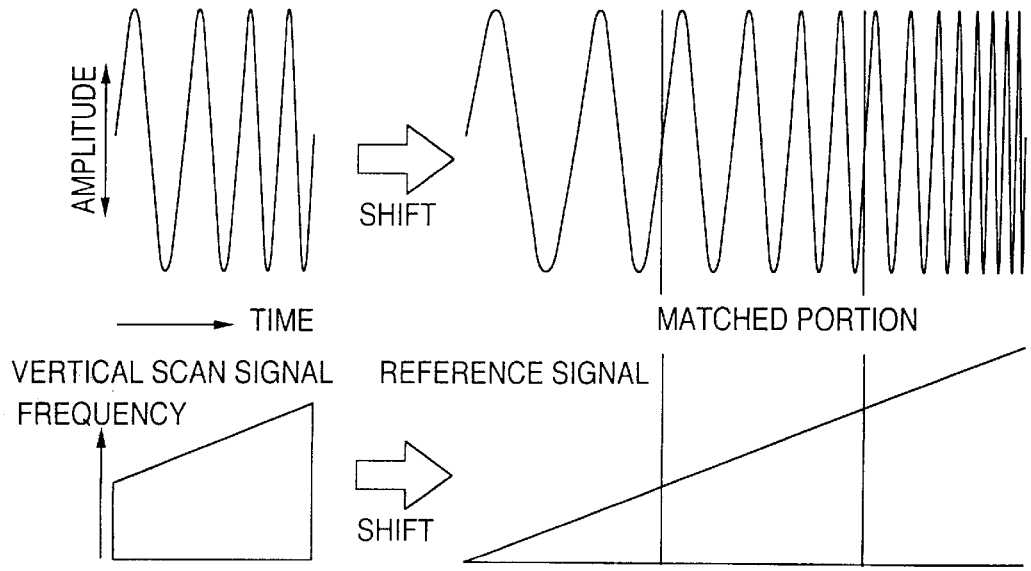

FIGS. 9A and 9B are diagrams showing the principle of a method of detecting the amount of Doppler shift by entering the vertical scan signal multiplied by the chirp signal into the correlator 25, in which the angle of incidence is 0° in FIG. 9A while the angle of incidence is 30° in FIG. 9B. FIGS. 9A and 9B each depict waveform representations at the top and frequency representations at the bottom. Each of these Figures depicts a situation in which a signal waveform is transferred to the right and, therefore, the right-hand side of the vertical scan signal represents its portion which occurred earlier in time. The vertical scan signal multiplied by the chirp signal shown on the left side in each of FIGS. 9A and 9B is a signal whose frequency varies along the time axis.

On the other hand, a chirp signal supplied to the correlator 25 as a reference waveform shown on the right side in each of FIGS. 9A and 9B is a signal whose frequency varies over a broader frequency range than the input vertical scan signal. The range of frequency change of the reference chirp signal corresponds to the range of Doppler shift of the vertical scan signal obtained when ultrasonic waves are received at the angles of incidence between 0° and 45° below the water surface. The vertical scan signal is Doppler-shifted in accordance with the angle of incidence of the received signal. A chirp signal is superimposed on the received signal as if it is biased with the Doppler frequency. The waveform of the vertical scan signal matches some portion of the waveform of the reference chirp signal entered into the correlator 25. The portion of the waveform of the reference chirp signal that matches the input vertical scan signal corresponds to the amount of Doppler shift, or to the angle of incidence α of the received ultrasonic waves.

Figure 10:
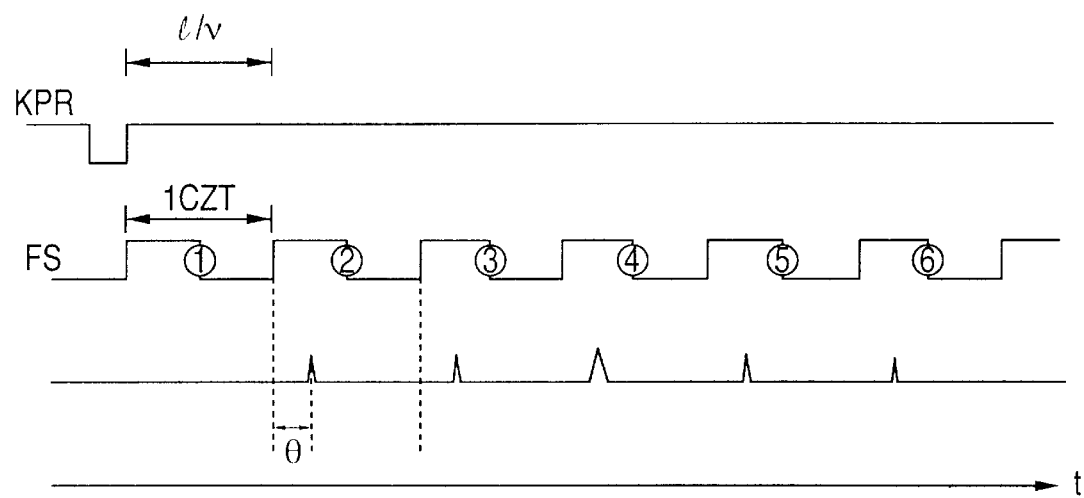
FIG. 10 is a diagram showing how a screen image is produced in the vertical scan mode.
Figure 10:
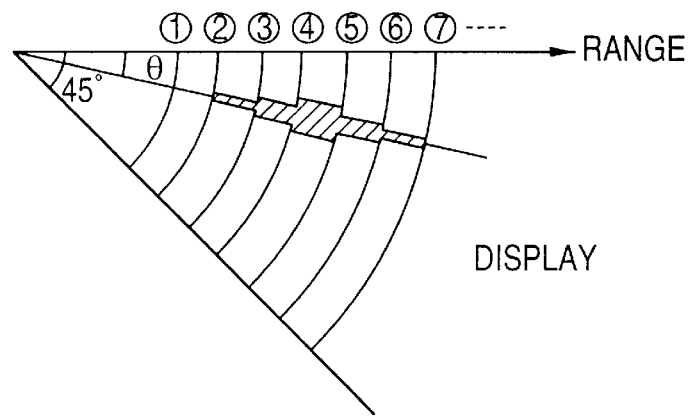

When the vertical scan signal, which is shifted through the correlator 25 based on a clock, matches a certain portion of the waveform of the reference chirp signal, the output signal level of the correlator 25 is maximized. Information on up to which point the vertical scan signal has been shifted when it has matched the portion of the waveform of the reference chirp signal is available from the controller 30 which outputs the clock for controlling the shift rate. Thus, scan angle (tilt angle) data calculated from the information on shift position and the output data of the correlator 25 are output to the display 4, whereby a video image of the target, which is supposed to exist at the tilt angle corresponding to the shift position where the correlator 25 has produced the high output signal level, can be displayed on the display 4. Vertical scanning is repeatedly made after each transmission by the transmitter block 2 and ultrasonic waves reflected by nearby targets to distant targets are sequentially detected. Then, the display 4 presents images of the detected targets as shown in FIG. 10 in accordance with the output signal of the correlator 25.

It is to be noted that the transducer is not limited to the construction including 16 layers and 30 columns shown in FIG. 3. Its vertical scan coverage is not necessarily limited to 0° to 45° below the water surface either. In one variation of the invention, the vertical scan coverage may include upward-looking angles.

Although the transducer 1 of the foregoing embodiment has a cylindrical shape, it is possible to employ a truncated cone-shaped transducer of which circular top surface has a larger diameter than the circular bottom surface. The transducer of this varied form is suited for searching underwater objects in areas closer to the sea bottom, rather than areas closer to the water surface, because transmission and receiving beams can be steered to greater tilt angles with the truncated cone-shaped transducer.

Detection of the amount of Doppler shift (frequency shift) is not limited to the aforementioned method, in which the vertical scan signal is multiplied by the chirp signal.

Furthermore, although the correlator 25 is commonly used in both the horizontal scan mode and the vertical scan mode in the foregoing embodiment, there may be provided separate correlators for the horizontal scan mode and the vertical scan mode so that completely difference channels are used in the individual modes.

What is claimed is:

1. A device for determining the angle of incidence of an incident ultrasonic signal comprising:

an ultrasonic transducer constructed of a plurality of transducer elements which are arranged in multiple layers and columns;

a horizontally focused beam former which sums signals received by the individual transducer elements of columns centered on a scan azimuth for each layer to generate horizontally focused beam signals which provide high horizontal directivity;

a vertical scan signal former which generates a vertical scan signal by sequentially selecting and combining the horizontally focused beam signals from the uppermost layer to the lowermost layer, or from the lowermost layer to the uppermost layer; and an angle detector which detects the angle of incidence of the incident ultrasonic signal based on the amount of frequency shift of the vertical scan signal.

2. The device as in claim 1, wherein said plurality of transducer elements form, as a whole, a generally cylindrical shape.

3. The device as in claim 1, wherein said plurality of transducer elements form a truncated cone shape having different top and bottom diameters.

4. The device as in claim 1, wherein said angle detector uses a range of frequency change in a chirp reference signal to determine the angle of incidence of the incident ultrasonic signal.

5. A method of determining the angle of incidence of an incident ultrasonic signal by using an ultrasonic transducer constructed of a plurality of transducer elements which are arranged in multiple layers and columns, said method comprising the steps of:

summing signals received by the individual transducer elements of columns centered on a specified scan azimuth for each layer to generate horizontally focused beam signals which provide high horizontal directivity;

generating a vertical scan signal by sequentially selecting and combining the horizontally focused beam signals from the uppermost layer to the lowermost layer, or from the lowermost layer to the uppermost layer; and detecting the angle of incidence of the incident ultrasonic signal based on the amount of frequency shift of the vertical scan signal.

6. The method as in claim 5, wherein said plurality of transducer elements form, as a whole, a generally cylindrical shape.

7. The method as in claim 5, wherein said plurality of transducer elements form a truncated cone shape having different top and bottom diameters.

8. The method as in claim 5, further comprising using a range of frequency change in a chirp reference signal to determine the angle of incidence of the incident ultrasonic signal.

9. A scanning sonar for receiving echo signals by reception beams successively formed in azimuthal directions and for displaying received signals on an indicator comprising:
- an ultrasonic transducer constructed of a plurality of transducer elements which are arranged in multiple layers and columns;
- a horizontally focused beam former which sums signals received by the individual transducer elements of columns centered on a scan azimuth for each layer to generate horizontally focused beam signals which provide high horizontal directivity;
- a vertical scan signal former which generates a vertical scan signal by sequentially selecting and combining the horizontally focused beam signals from the uppermost layer to the lowermost layer, or from the lowermost layer to the uppermost layer; and
- an angle detector which detects the angle of incidence of an incident ultrasonic signal based on the amount of frequency shift of the vertical scan signal;
- a vertically focused beam former which sums signals received by the individual transducer elements of each column to generate vertically focused beam signals which provide high vertical directivity;
- a horizontal scan signal former which forms a horizontal scan signal by sequentially selecting and combining the vertically focused beam signals derived from the individual columns around the transducer; and
- a signal generator which takes out a signal from a specified direction based on the amount of frequency shift of the horizontal scan signal.

10. A scanning sonar according to claim 9 wherein said angle detector and said signal generator share a common correlator.

11. The scanning sonar as in claim 10, wherein a range of frequency change in a chirp reference signal is used to determine the angle of incidence of the incident ultrasonic signal.

12. The scanning sonar as in claim 9, wherein said plurality of transducer elements form, as a whole, a generally cylindrical shape.

13. The scanning sonar as in claim 9, wherein said plurality of transducer elements form a truncated cone shape having different top and bottom diameters.

14. A scanning sonar comprising:
- an ultrasonic transducer constructed of a plurality of transducer elements which are arranged in multiple layers and columns;
- a horizontally focused beam former which sums signals received by the individual transducer elements of columns centered on a scan azimuth for each layer to generate horizontally focused beam signals which provide high horizontal directivity;
- a vertical scan signal former which generates a vertical scan signal by sequentially selecting and combining the horizontally focused beam signals from the uppermost layer to the lowermost layer, or from the lowermost layer to the uppermost layer; and
- an angle detector which detects the angle of incidence of an incident ultrasonic signal based on the amount of frequency shift of the vertical scan signal;
- a vertically focused beam former which sums signals received by the individual transducer elements of each column to generate vertically focused beam signals which provide high vertical directivity;
- a horizontal scan signal former which forms a horizontal scan signal by sequentially selecting and combining the vertically focused beam signals derived from the individual columns around the transducer; and
- a signal generator which takes out a signal from a specified direction based on the amount of frequency shift of the horizontal scan signal;
- wherein said vertically focused beam former, said horizontal scan signal former and said signal generator are activated in horizontal scan mode, and said horizontally focused beam former, said vertical scan signal former and said angle detector are activated in vertical scan mode.

15. The scanning sonar as in claim 14, wherein said plurality of transducer elements form, as a whole, a generally cylindrical shape.

16. The scanning sonar as in claim 14, wherein said plurality of transducer elements form a truncated cone shape having different top and bottom diameters.

17. A scanning sonar comprising:
- an ultrasonic transducer constructed of a plurality of transducer elements which are arranged in multiple layers and columns;
- a horizontally focused beam former which sums signals received by the individual transducer elements of a plurality of columns centered on a scan azimuth for each layer to generate horizontally focused beam signals which provide high horizontal directivity;
- a vertical scan signal former which generates a vertical scan signal by sequentially selecting and combining the horizontally focused beam signals from the uppermost layer to the lowermost layer, or from the lowermost layer to the uppermost layer; and
- a first detector receiving incoming signals based on the amount of frequency shift of the vertical scan signals;
- a vertically focused beam former which sums signals received by the individual transducer elements of each column to generate vertically focused beam signals which provide high vertical directivity;
- a horizontal scan signal former which forms a horizontal scan signal by sequentially selecting and combining the vertically focused beam signals derived from the individual columns around the transducer; and
- a second detector receiving incoming signals from directions based on the amount of frequency shift of the horizontal scan signals; and
- a display device displaying signals from said first detector or displaying signals from said second detector.

* * * * *